United States Patent
Conte (10) Patent No.: US 9,326,901 B2
(45) Date of Patent: May 3, 2016

(54) REMOVABLE MOTOR POWER DEVICE FOR WHEELCHAIRS OF DISABLED USERS

(71) Applicant: Giovanni Conte, Paderno Dugnano (MI) (IT)

(72) Inventor: Giovanni Conte, Paderno Dugnano (MI) (IT)

(*) Notice: Subject to any disclaimer, the term of this patent is extended or adjusted under 35 U.S.C. 154(b) by 0 days.

(21) Appl. No.: 14/295,668

(22) Filed: Jun. 4, 2014

(65) Prior Publication Data

US 2015/0351979 A1    Dec. 10, 2015

(30) Foreign Application Priority Data

Jun. 4, 2013    (IT) ................................ AN2013A0103

(51) Int. Cl.
*A61G 5/04*    (2013.01)
*B62B 3/06*    (2006.01)
*A61G 5/10*    (2006.01)

(52) U.S. Cl.
CPC .............. *A61G 5/047* (2013.01); *B62B 3/0612* (2013.01); *A61G 2005/1051* (2013.01)

(58) Field of Classification Search
CPC ........... A61G 5/047; A61G 2005/1051; B62B 3/0612
USPC ................................................ 180/13, 12, 11
See application file for complete search history.

(56) References Cited

U.S. PATENT DOCUMENTS

| | | | | | |
|---|---|---|---|---|---|
| 3,912,032 | A | * | 10/1975 | Benz et al. | 180/13 |
| 5,207,286 | A | * | 5/1993 | McKelvey | 180/13 |
| 5,494,126 | A | * | 2/1996 | Meeker | 180/13 |
| 5,651,422 | A | * | 7/1997 | Casali | 180/13 |
| 6,883,632 | B2 | * | 4/2005 | McHardy et al. | 180/315 |
| 6,938,711 | B2 | * | 9/2005 | Kime et al. | 180/11 |
| 7,216,728 | B2 | * | 5/2007 | Huang et al. | 180/13 |
| 7,721,835 | B2 | * | 5/2010 | Radtke | 180/205.5 |
| 7,976,049 | B2 | * | 7/2011 | Chiu | 280/304.1 |
| 8,684,113 | B1 | * | 4/2014 | Laconis | 180/11 |
| 2008/0115982 | A1 | * | 5/2008 | Lin | 180/13 |

FOREIGN PATENT DOCUMENTS

| | | |
|---|---|---|
| EP | 1927331 A1 | 6/2008 |
| WO | 2009002543 A1 | 12/2008 |

* cited by examiner

*Primary Examiner* — Anne Marie Boehler
*Assistant Examiner* — Marlon Arce
(74) *Attorney, Agent, or Firm* — Egbert Law Offices, PLLC (57) ABSTRACT

A motor power device for wheelchairs of disabled users is removably mounted on the front of the wheelchair-in order to be controlled by the user while sitting on the wheelchair. The device has a motor unit provided with an electrical motor, an intermediate frame disposed between the motor unit and the wheelchair, first inclination adjusting means between the motor unit and the intermediate frame and second inclination adjusting means between the intermediate frame and a bearing frame of the wheelchair. The intermediate frame and the motor unit are mounted and dismounted easily and rapidly.

12 Claims, 8 Drawing Sheets

REMOVABLE MOTOR POWER DEVICE FOR WHEELCHAIRS OF DISABLED USERS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present patent application for industrial invention relates to a removable motor power device for wheelchairs of disabled users.

2. Description of Related Art Including Information Disclosed Under 37 CFR 1.97 and 37 CFR 1.98

As it is known, two main types of wheelchairs for disabled users are known: wheelchairs without motor power, which are moved by the force exerted by the arms of the disabled user or are pushed by another person, and wheelchairs equipped with an electrical motor, which are moved and controlled by the disabled user with a suitable joystick.

Evidently, motor powered wheelchairs guarantee higher autonomy and better operation for the user compared to traditional non-powered wheelchairs. Nevertheless, motor powered wheelchairs are impaired by a considerable drawback. The fact that they are provided with an electrical motor and with the components used to transfer the power developed by the motor to the wheels of the wheelchair makes the wheelchair structure considerably heavy and completely "rigid" in such manner that the wheelchair cannot be folded or at least compacted, as in the case of the lighter wheelchairs without a motor. As a matter of fact, motor powered wheelchairs cannot be folded or stored in the trunk of a car, as it normally occurs with non-powered wheelchairs.

Such a problematic issue has already been addressed, with results that cannot be considered fully satisfactory, by providing a non-powered wheelchair for disabled users with a motor unit adapted to be mounted and dismounted easily from the front of the wheelchair according to the specific requirements. Such a powered unit, which can be controlled manually by the disabled user while sitting on the wheelchair, is provided with at least one steering wheel associated with an electrical motor and provided on the back with a substantially horizontal frame that allows for fixing to the frame of the wheelchair.

The drawback of such a technology is related to the large volume of the motor unit. In fact, the motor unit has a rather large three-dimensional structure, both vertically and horizontally, which is unpractical to handle and store, including separately from the wheelchair. In such a technological situation, the vertical volume is generated by the structure that supports the steering wheel and the means used to control the steering of the wheel, whereas the horizontal volume is generated by the frame that protrudes on the back from the structure that supports the wheel for connection with the frame of the non-powered wheelchair.

U.S. Pat. No. 5,651,422 discloses a wheelchair provided with power drive. However the motor unit is directly connected to the transverse rods of a framework of the wheelchair. Thus U.S. Pat. No. 5,651,422 does not provide for an intermediate frame disposed between the motor unit and the wheelchair in order to change the position of the wheelchair according to the route.

WO2009/002543 discloses a wheelchair with an auxiliary nonpowered device with hand pedals. The auxiliary device is connected to the bearing frame of the wheelchair by means of an articulated system comprising two arms and two connections provided with omnidirectional spherical joints. The system is self-adjusting and does not allow for changing the inclination of the frame according to the route.

EP1927331 discloses a wheelchair with motor unit comprising an H-shaped intermediate frame that does not allow for adjusting the inclination with respect to the motor unit and to the bearing frame of the wheelchair.

The purpose of the present invention is to devise a motor power device used to move wheelchairs for disabled users, which can be removed in order to reduce volumes.

Another purpose of the present invention is to simplify the coupling and uncoupling of the motor power device with the wheelchair.

Another purpose of the present invention is to devise a motor power device adapted to adjust the general position of the wheelchair from time to time according to the route and to the higher or lower regularity of the road surface.

BRIEF SUMMARY OF THE INVENTION

These purposes are achieved according to the invention with the characteristics claimed in independent claim 1.

Advantageous embodiments appear from the dependent claims.

The device of the invention comprises:
- a motor unit comprising a head tube that supports a powered wheel at the base and a directional handlebar on top;
- an intermediate frame, substantially shaped as a fork, adapted to be removably fixed to the head tube and to a bearing frame of the wheelchair that supports the seat of the wheelchair;
- first inclination adjusting means disposed between the motor unit and the intermediate frame for adjusting the inclination of the head tube of the motor unit with respect to the intermediate frame; and
- second inclination adjusting means disposed between the intermediate frame and the bearing frame of the wheelchair for adjusting the inclination of the intermediate frame with respect to bearing frame of the wheelchair.

When the device of the invention is fixed to the bearing frame of the wheelchair, a "self-moving vehicle" composed of the wheelchair and of the motor power device used to move the wheelchair is formed.

The limited volume of the self-moving vehicle originates from the possibility of dismounting the device of the invention easily in two main components (head tube and intermediate frame), which are both provided with a light structure that guarantees the simplicity and rapidity of the handling and storing operations, for example in the trunk of a car, separately from the wheelchair for disabled users.

Moreover, the two components are extremely practical also during assembly when the device of the invention is fixed to the wheelchair for disabled users.

The "self-moving vehicle" rests on the ground only with three wheels, i.e. with the two large non-steering side wheels of the wheelchair and the steering wheel of the device of the invention. The two small swiveling wheels, which are normally provided in the front of the wheelchair at the lower ends of the uprights that support the seat, remain lifted from the ground.

The possibility of changing the position of the "self-moving vehicle" is related with the higher or lower height from the ground imposed by the device of the invention to said small swiveling wheels of the wheelchair. The possibility of changing the position of the "self-moving vehicle" also refers to the possibility of adjusting the total length of the wheelbase of the "self-moving vehicle", with consequent higher or lower weight distribution towards the front steering wheel.

Of course, in case of a rough road surface, it is recommended to keep the swiveling wheels at a higher distance from the ground in order to avoid a dangerous interference with the road bumps. The efficacy of the device of the invention also consists in the fact that, in the latter condition, the length of the wheelbase of the "self-moving vehicle" is reduced and a higher weight is transferred to the front steering wheel, thus resulting in a better directionality of the steering wheel also on bumpy roads.

Instead, in case of regular road surfaces, the swiveling wheels can be maintained at a lower distance from the ground, in such a condition that the wheelbase of the "self-moving vehicle" is increased, and a lower weight is transferred to the front steering wheel, which does not need high directionality in presence of the regular road surface.

BRIEF DESCRIPTION OF THE SEVERAL VIEWS OF THE DRAWINGS

For explanatory reasons, the description of the invention continues with reference to attached drawings, which only have an illustrative, not limiting value, wherein.

DETAILED DESCRIPTION OF THE INVENTION

Figure 1:
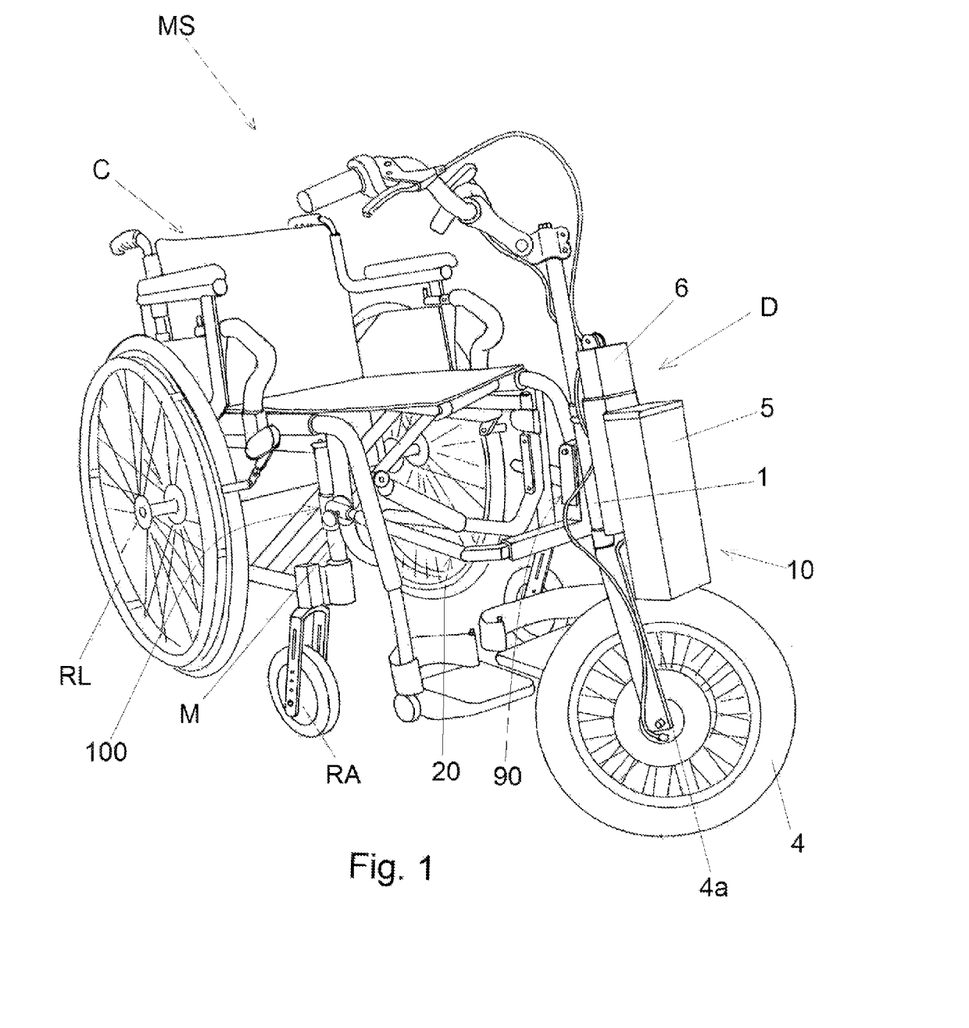
FIG. 1 is an axonometric view of the "self-moving vehicle" obtained after fixing the invention on the front of the wheelchair for disabled users.
Figure 8:
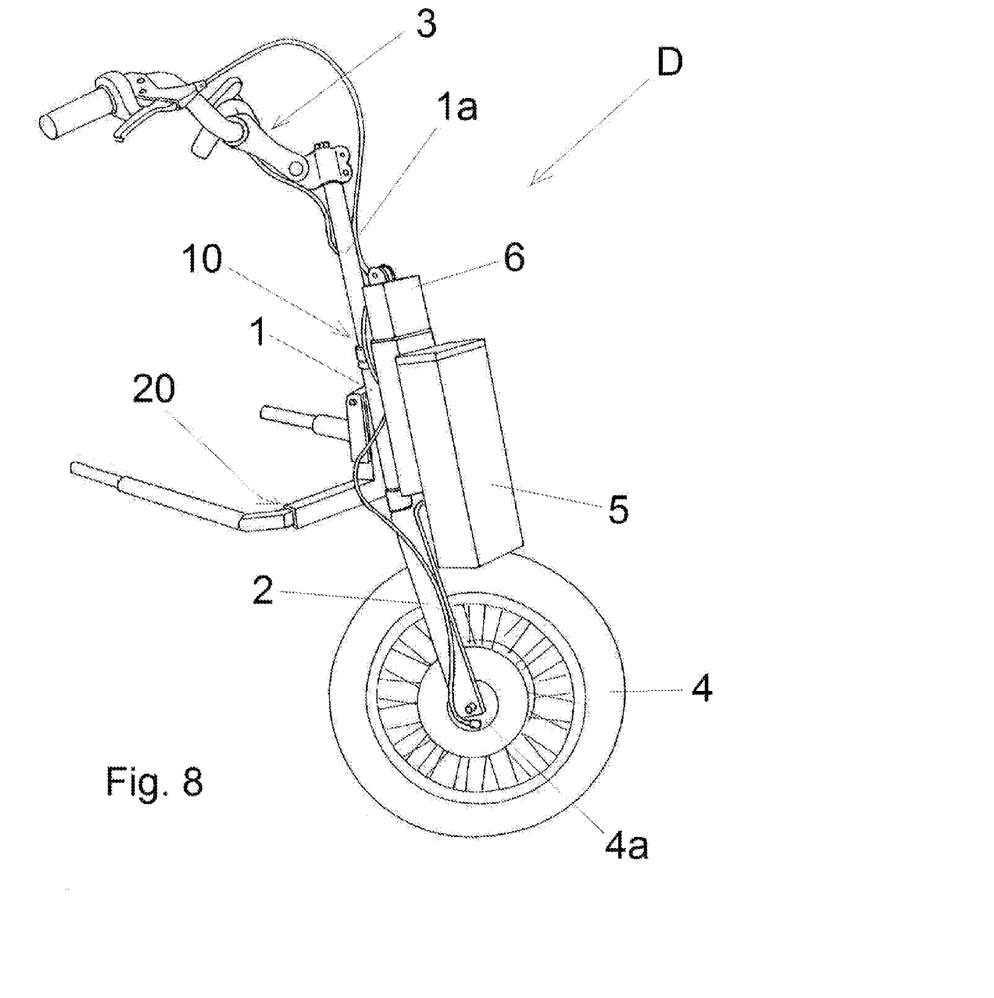
FIG. 8 is a side view of the device according to the invention after assembly.

Referring to FIGS. 1 and 8 the device of the invention is disclosed, being generally indicated as (D).

The device (D) consists in a motor unit, comprising a steering wheel (4) actuated by an electrical motor. The device (D) is adapted to be removably fixed on the front of a traditional wheelchair for disabled users (C) in order to move the wheelchair (C).

With reference to FIG. 1, the combination of the device (D) and the wheelchair (C) originates a single "self-moving vehicle" (MS) that can be autonomously controlled by the disabled user while sitting.

Figure 3:
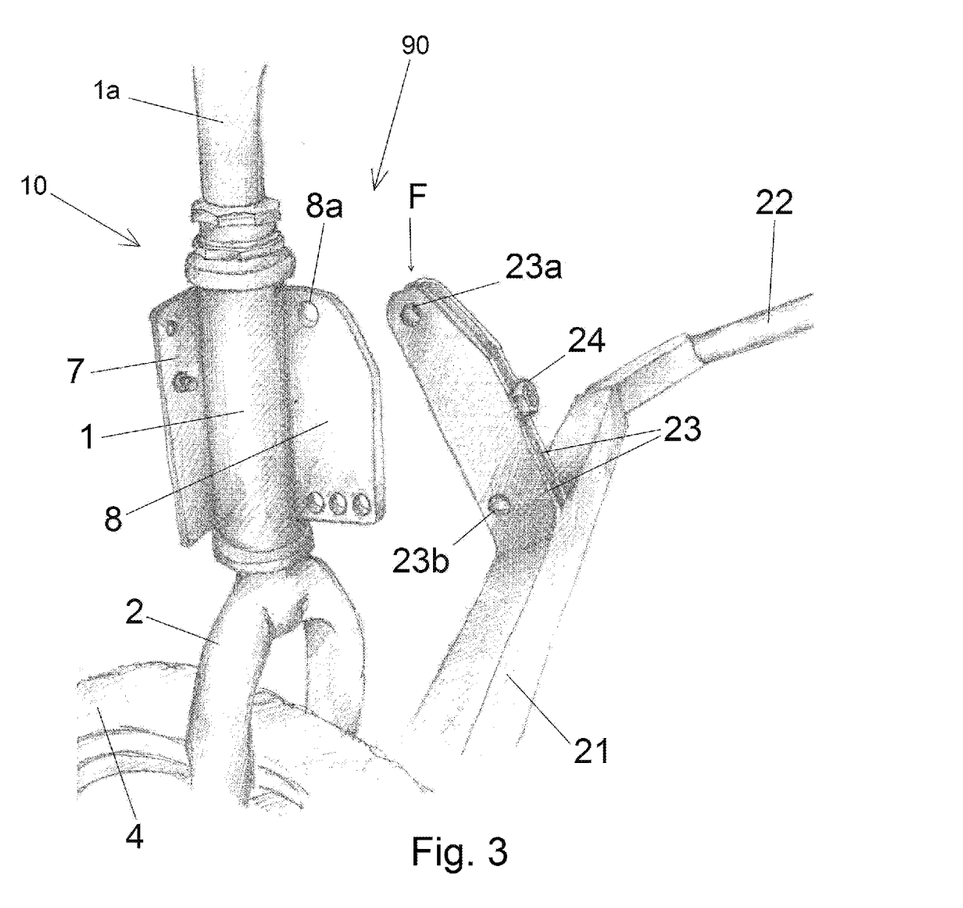
FIG. 3 is an exploded perspective view of the first component and the second component of the device according to the invention.

Referring to FIGS. 8 and 3, the device (D) comprises two main components (10, 20). The components consist in a motor unit (10) and an intermediate frame (20) adapted to be connected to a bearing frame of the wheelchair (C).

The motor unit (10) comprises a head tube (1) wherein a steering column (1a) is inserted. The steering column (la) is connected to a fork (2) in lower position and to a handlebar (3) in upper position. The fork (2) supports the steering wheel (4) provided with disc brake. The steering wheel has a hub (4a) that incorporates the electrical motor adapted to be powered by a battery (5) fixed on the head tube (1). An electronic control unit (6) is mounted on the head tube (1) in order to manage and control the electrical motor. The control unit (6) is connected to a potentiometer mounted on the handlebar (3). By means of the potentiometer the user can adjust the rotation of the electrical motor and consequently the traveling speed of the "self-moving vehicle" (MS).

The intermediate frame (20) is adapted to be fixed to the wheelchair (C). The intermediate frame (20) is substantially shaped as a fork, and comprises a crosspiece (21) and two lateral arms (22) orthogonal to the crosspiece (21). The crosspiece (21) is adapted to be removably fixed to the head tube (1) of the motor unit (10) by means of first inclination adjusting means (90), with the possibility of adjusting the mutual position of the motor unit and the intermediate frame.

With reference to FIG. 1, the lateral arms (22) of the intermediate frame comprise second inclination adjusting means (100) adapted to be removably fixed, practically and quickly, to lateral uprights (M) that frontally support the seat of the wheelchair (C).

Figure 2:
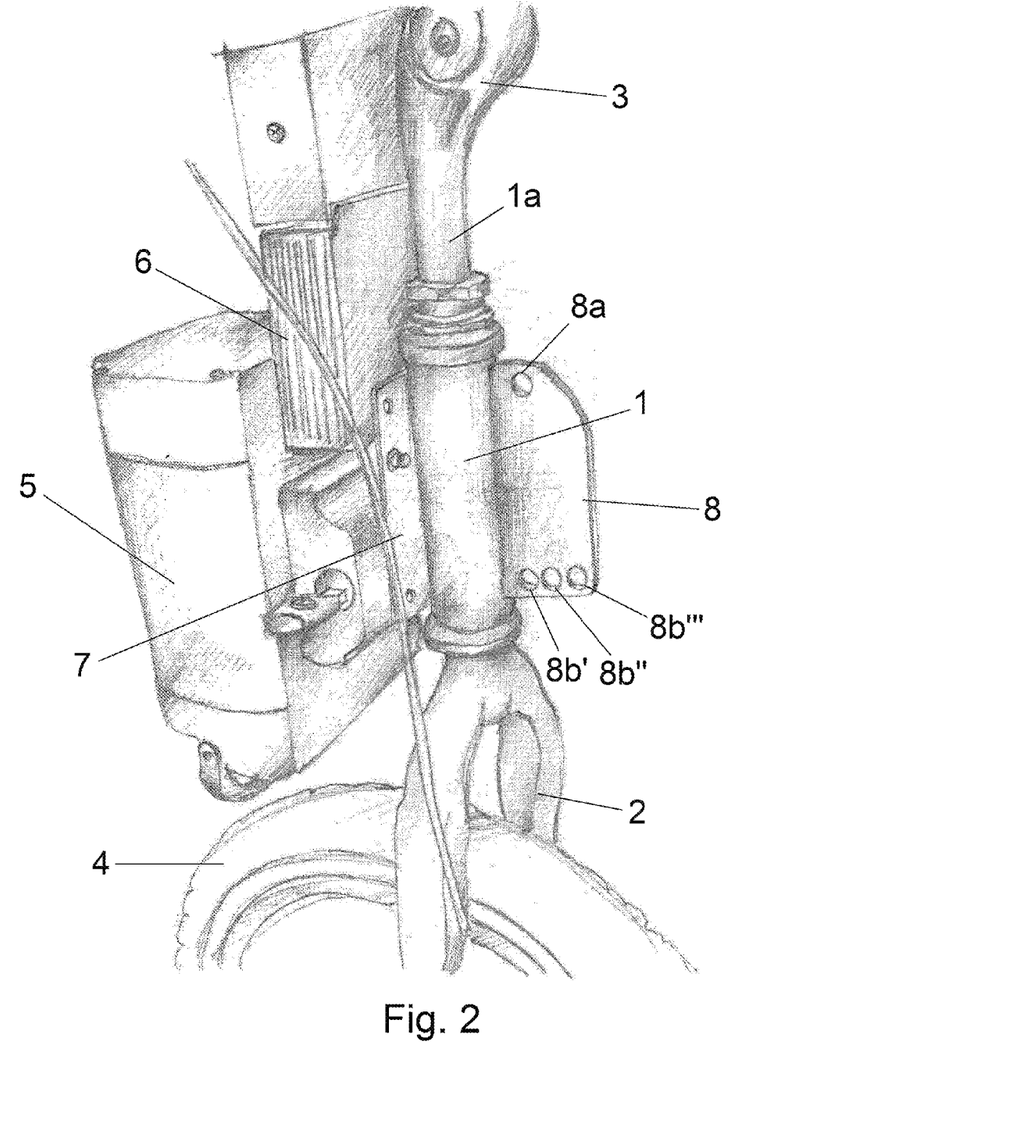
FIG. 2 is a perspective view of a detail of the first component of the device according to the invention.

Referring to FIG. 2, the head tube (1) comprises a support plate (7) in order to fix the battery (5) and the control unit (6), and a flange (8) that protrudes radially backward from the head tube (1).

The flange (8) develops vertically and is orthogonal to the support plate (7). The flange (8) has a substantially rectangular profile and comprises a first circular hole (8a) proximal to the upper edge of the flange, and a plurality of horizontally aligned second holes (8b', 8b'', 8b''') disposed in proximal position to the lower edge of the flange (8).

Figure 4:
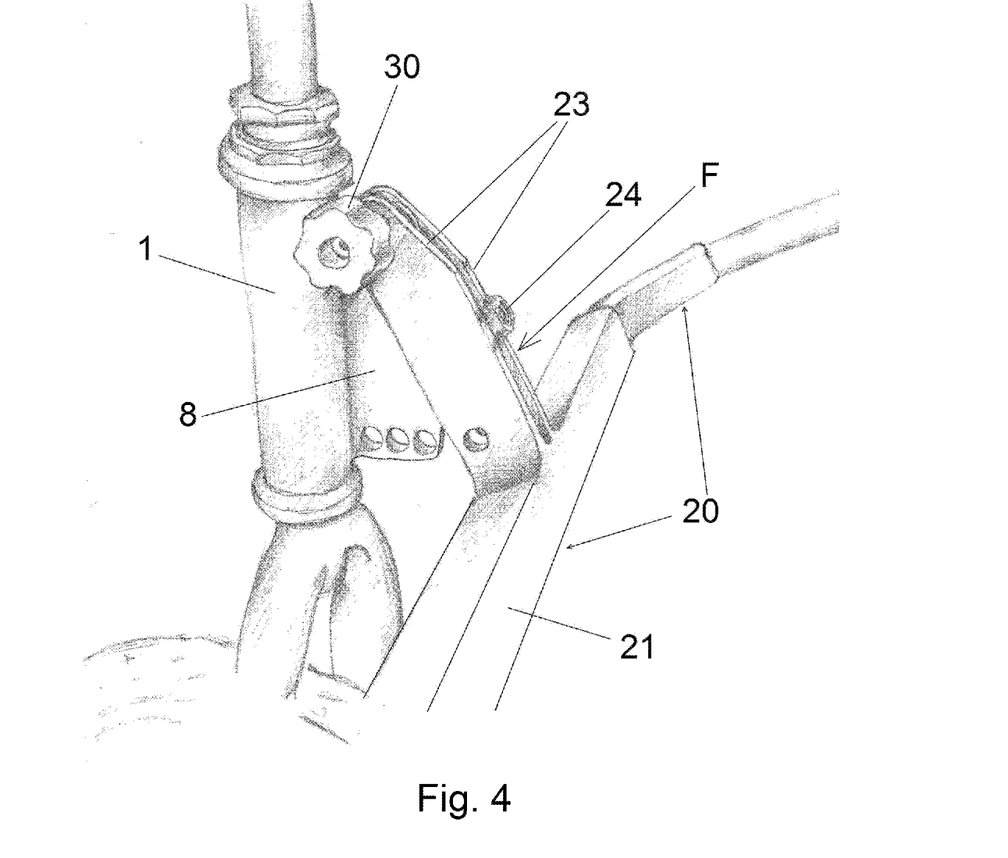
FIG. 4 is the same view as FIG. 3, except for it shows the two components of the device according to the invention in a first assembly step.

Referring to FIGS. 3 and 4, the intermediate frame (20) comprises a fork (F) disposed in central position on the crosspiece (21) and protruding from the crosspiece. The fork (F) is formed of a pair of brackets (23) that are substantially rectangular and orthogonal to the axis of the crosspiece (21). The brackets (23) are parallel in order to leave a space adapted to receive the flange (8) of the head tube. The height of the brackets (23) is substantially identical to the height of the flange (8) of the head tube. The width of the space between the brackets (23) is slightly higher than the thickness of the flange (8).

Each bracket (23) is crossed by a first circular hole (23a) disposed in proximal position to the upper edge of the brackets, and a second circular hole (23b) disposed in proximal position to the crosspiece (21). Each hole (23a, 23b) of the brackets has the same shape and diameter as the holes (8a, 8b', 8b'', 8b''') of the flange (8) of the head tube. The distance between the first hole (23a) and the second hole (23b) of the brackets (23) exactly corresponds to the distance between the first hole (8a) and any one of the second holes (8b', 8b'', 8b''') of the flange.

The flange (8) and the fork (F) are the first inclination adjusting means (90).

A threaded bush (24) is disposed in an intermediate position between the two brackets (23) in such a way to protrude from the back. The threaded bush (24) is welded to the brackets. The axis of the threaded bush (24) is orthogonal to the crosspiece (21).

Figure 5:
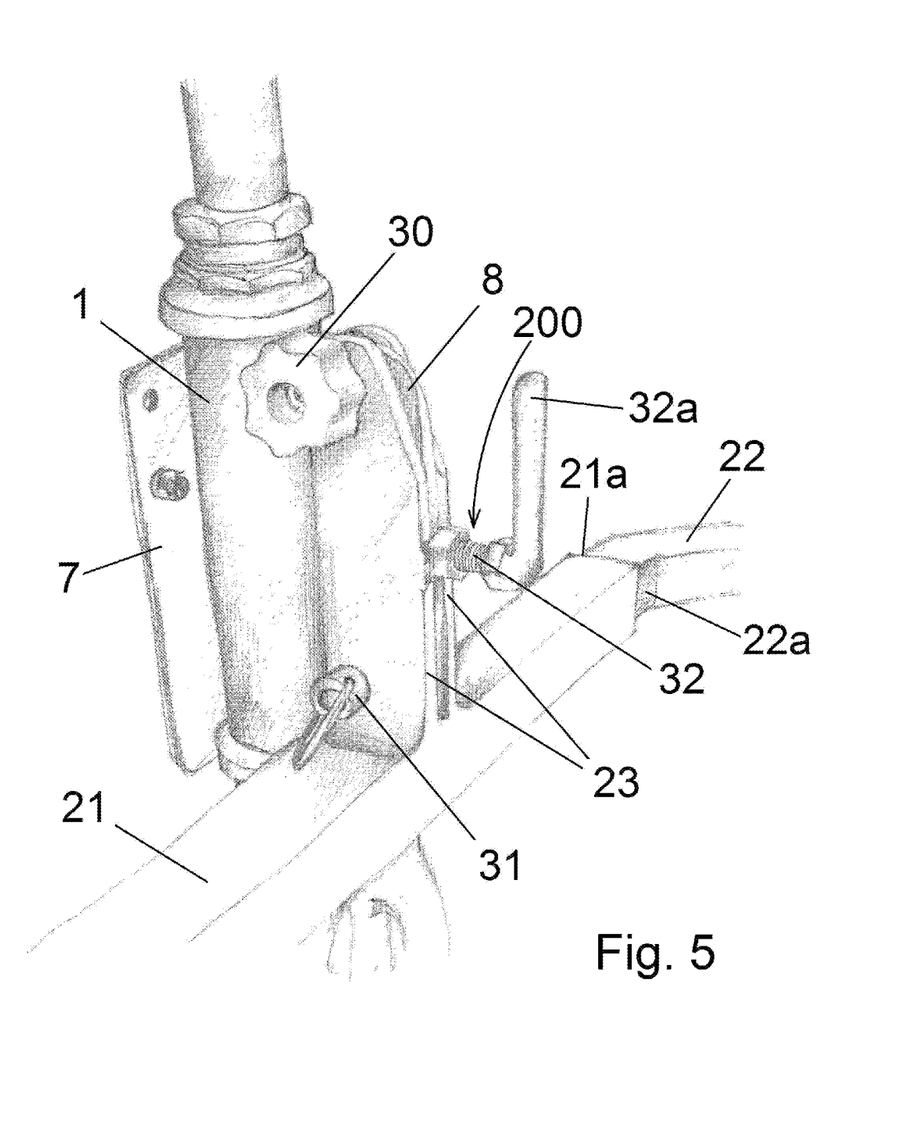
FIG. 5 is the same view as FIG. 3, except for it shows the two components of the device according to the invention after assembly is completed.

Referring to FIG. 5, the crosspiece (21) of the intermediate frame has a tubular structure with open ends (21a) to receive the lateral arms (22). Each arm (22) has a first section (22a) that is substantially orthogonal to the remaining part of the arm, it being adapted to be slidingly inserted into the end (21a) of the crosspiece (21). In view of the above, by pulling out the first sections (22a) of the lateral arms (22) from the ends (21a) of the crosspiece, the width of the intermediate frame (20)—i.e. the distance between the two arms (22)—can be adjusted to the width of the wheelchair for disabled users (C).

Although they are not shown in the enclosed figures, the first sections (22a) of the two lateral arms (22) of the intermediate frame are provided with fixing means to stabilize the coupling with the ends (21a) of the crosspiece (21) after the user has pulled out the arms from the crosspiece.

Figure 7:
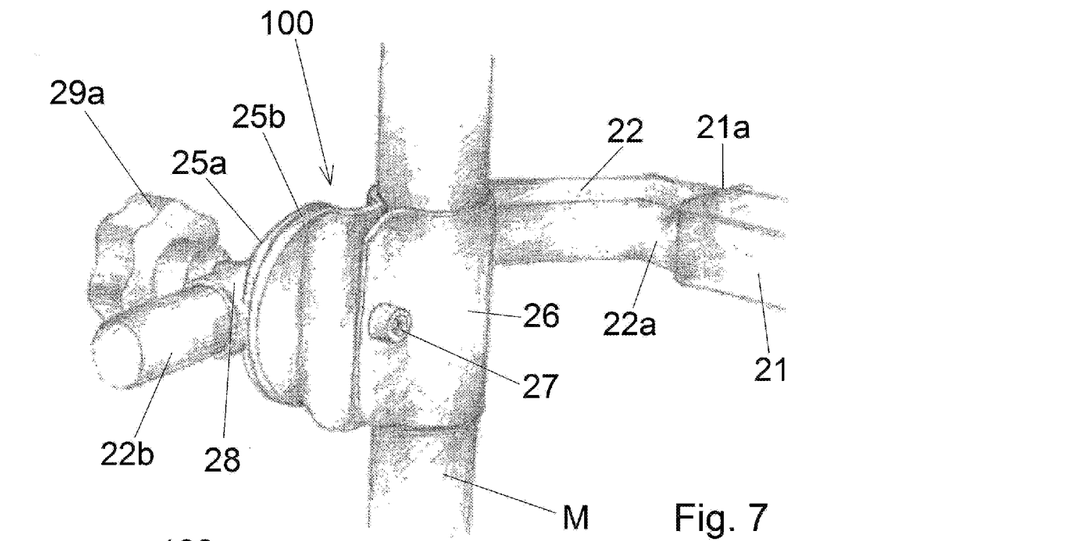
FIG. 7 is a perspective view of the joint of FIG. 6 fixed to an upright of the bearing frame of the wheelchair and to the intermediate frame of the device according to the invention.

Referring to FIG. 7, each lateral arm (22) of the intermediate frame has an end circular section (22b) adapted to support the second inclination adjusting means (100) that consist in a joint (100).

The joint (100) comprises a fast-coupling sleeve (26) of double-jaw type, which is specifically adapted to connect the intermediate frame (20) with the uprights (M) of the support frame of the wheelchair for disabled users (C) that support the seat.

Figure 6:
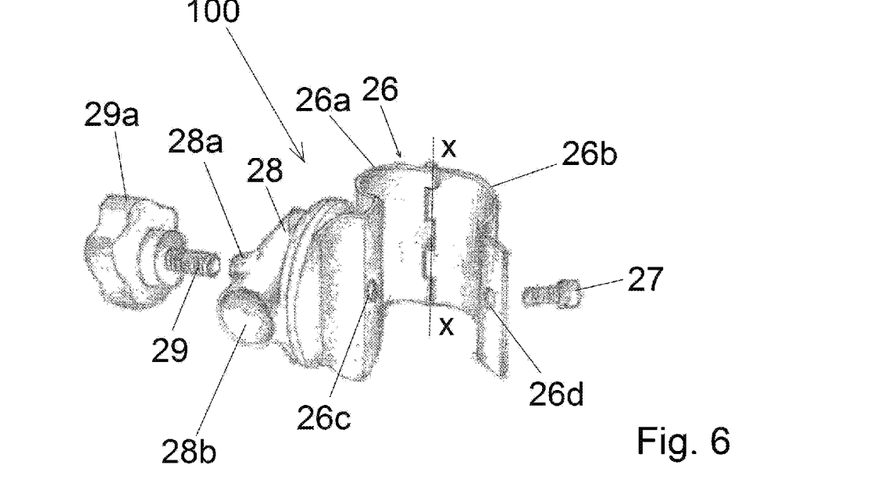
FIG. 6 is a perspective view of joint used to fix the device according to the invention to the wheelchair of disabled users.

Referring to FIG. 6, said sleeve (26) comprises two semi-cylindrical jaws (26a, 26b) that are mutually hinged with respect to an axis (x-x). The jaws (26a, 26b) are firmly fixed by means of a transverse connection screw (27) adapted to be simultaneously engaged into holes (26c, 26d) obtained in proximal position to the lateral edges of the jaws.

The joint (100) comprises a tubular element (28) having a cylindrical duct (28b). The cylindrical duct (28b) of the tubular element is adapted to receive the cylindrical end section (22b) of the lateral arm (22).

When the cylindrical end section (22b) of the lateral arm (22) is engaged into the cylindrical duct (28b) of the tubular element of the joint, the coupling between the lateral arm of the intermediate frame and the tubular element of the joint is stabilized by means of a screw (29) that is screwed into a threaded hole (28a) radially provided in the tubular element (28) until it stops against the end section (22b) of the lateral arm (22). The screw (29) is provided with a knob (29a).

Referring to FIG. 7, the tubular element (28) is mounted on a first disc (25a) that is rotatably coupled with a second disc (25b) fixed to a jaw (26a) of the sleeve (26). By taking advantage of the rotation of the first disc (25a) with respect to the second disc (25b) the inclination of the tubular element (28) can be adjusted with respect to the axis of the sleeve (26) that receives the upright (M) of the bearing frame of the wheelchair.

The adjustment of the position of the tubular element (28) is useful whenever the end section (22b) of each of the arms (22) of the intermediate frame (20) and the upright (M) of the wheelchair for disabled users (C) are not perfectly perpendicular.

Figure 6A:
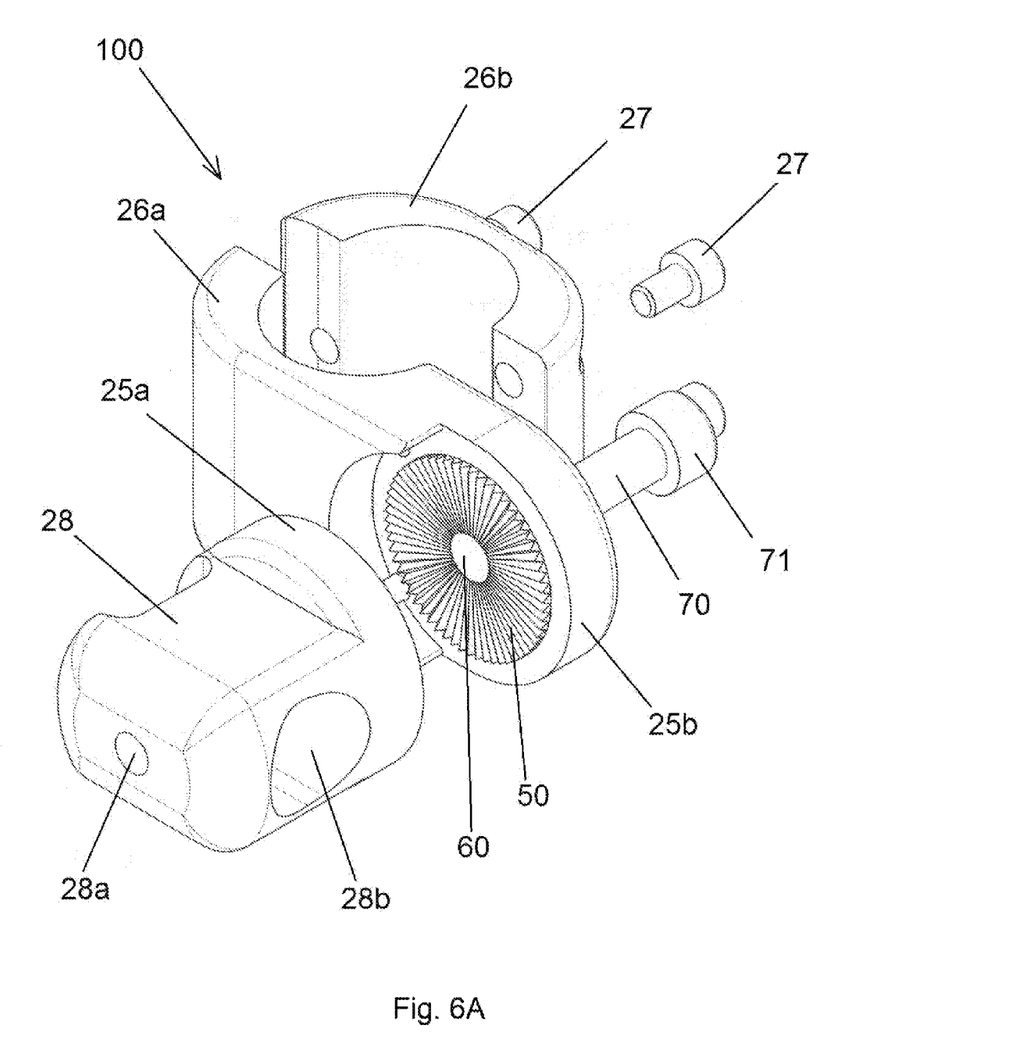
FIG. 6A is a perspective view showing a different version of the joint of FIG. 6.

FIG. 6A shows a different embodiment (100) wherein the jaws (26a, 26b) of the sleeve, instead of being hinged, are separate and fixed by means of fixing screws (27).

With reference to FIG. 6A, each disc (25a, 25b) of the joint (100) comprises a coupling side (50) having a plurality of radial ribs and grooves to allow for the exact angular adjustment between the two discs and prevent the rotation of a disc with respect to the other disc when the two discs are tightened.

The second disc (25b) has a through central hole (60), whereas the first disc has a threaded blind central hole (not shown). A tightening bolt (70) is inserted into the through central hole of the second disc (25b) and is screwed into the threaded central hole of the first disc (25a) in order to tighten the discs. The tightening bolt (70) has a knob (71) that can be actuated by the user manually.

A description of the assembly and operation of the device (D) is provided below.

The first operation consists in joining the head tube (1) of the motor unit (10) with the intermediate frame (20). In order to do this, the crosspiece (21) of the intermediate is brought close to the flange (8) of the head tube (1) in such manner that the flange (8) can be inserted between the two brackets (23) of the crosspiece (21). Moreover, the first hole (8a) of the flange (8) must be perfectly aligned with the first hole (23a) of the two brackets (23) in order to insert the stem of a screw with horizontal axis (30) through the three aligned holes (8a, 23a), said screw being suitably provided with a knob in such manner that the stem protrudes from the opposite side and is coupled with a nut.

The coupling between the flange (8) and the pair of brackets (23) is not a rigid coupling and the stem of the connection screw (30) is the pivoting point with respect to which the intermediate frame (20) can oscillate freely with respect to the head tube (1) of the motor unit (10). However, such an oscillating capacity of the intermediate frame (20) is lost when a lock pin (31) is simultaneously inserted into one of the second holes (8b', 8b'', 8b''') of the flange (8) and into the second hole (23b) of the two brackets (23).

The oscillating capacity of the intermediate frame (20) allows the user to choose—even before stabilizing the connection between the head tube (1) and the intermediate frame (20)—the hole from the second holes (8b', 8b'', 8b''') of the second flange (8) that must be perfectly aligned between the second hole (23b) of the pair of brackets (23).

Referring to FIG. 5, a lock pin (31) is inserted through the three previously aligned second holes (23b/8b', 8b'', 8b''').

After inserting the screw (30) and the lock pin (31), the last operation consists in screwing a threaded stem (32) provided with a handle (32a) inside the threaded bush (24) fixed to the two flanges (23).

The first and the second holes (8a, 8b', 8b'', 8b'''/23a, 23b) of the second flange (8) and of the two brackets (23) have a slightly higher section than the diameter of the screw (30) and the lock pin (31). The elimination of an extremely precise coupling between the screw (30) and the lock pin (31) with the first and the second holes (8a, 8b', 8b'', 8b'''/23a, 23b) simplifies the insertion of the screw (30) and the lock pin (31) inside the corresponding holes, also for the disabled user sitting on the wheelchair (C).

Because of the dimensional difference between the screw (30) and the lock pin (31) with respect to the holes (8a, 8b', 8b'', 8b'''/23a, 23b), the mutual connection between the flange (8) of the head tube (1) of the motor unit (10) and the brackets (23) of the intermediate frame (20) originates a considerable clearance between the motor unit (10) and the intermediate frame (20).

On the contrary, because of the progressive screwing of the threaded stem (32) inside the threaded bush (24), the tip of the stem (32) passes through the space provided between the two brackets (23) and stops against the front edge of the flange (8) of the head tube (1) of the motor unit (10).

Obviously, the tighter the threaded stem (32) is between the bush (24) and the front edge of the flange (8), the lower the risk is that the two brackets (23) generate clearance with respect to the flange (8). As a matter of fact, there is a "loose" coupling of the screw (30) into the first holes (23a, 8a) and of the lock pin (31) of the second holes (23b, 8b', 8b'', 8b''').

The threaded bush (24) and the threaded stem (32) generate friction means (200) to eliminate the clearance between the flange (8) and the two brackets (23). Although in the attached figures the friction means (200) are mounted on the back edge of the two brackets (23), they can be mounted anywhere on the brackets (23) and comprise an element that is frictionally stopped on the flange (8).

After coupling the head tube (1) with the intermediate frame (20), the user can fix the device (D) to the wheelchair (C) as shown in FIG. 1. In order to do that, the user can use the joints (100) mounted in the end sections (22b) of the lateral arms (22) of the intermediate frame (20), as shown in FIG. 7. Because of the action of the tightening screw (27), the sleeves (26) of the joints firmly embrace the uprights (M) of the support frame of the seat of the wheelchair (C).

FIG. 1 shows the self-moving vehicle (MS) after assembly. As shown in the figure, while sitting on the wheelchair (C), the user can comfortably hold the handlebar (3) to establish the forward-traveling direction of the steering wheel (4). Of course, such a handlebar (3) comprises an actuation lever of the brake associated with the steering wheel (4) and of the potentiometer interfaced with the electronic control unit (6) that allows the user to adjust the traveling speed of the "self-moving vehicle" (MS).

As shown in FIG. 1 the "self-moving vehicle" (MS) rests on the ground only with three wheels, i.e. the steering wheel (4) of the device (D) and the two large side wheels (RL) of the wheelchair (C), whereas the two front swiveling wheels (RA) of the wheelchair are lifted from the ground.

From time to time, the user of the device (D) may decide the height of the swiveling wheels (RA) from the ground, also in consideration of the roughness of the surface whereon the "self-moving vehicle" is traveling (MS).

The user has a number of options equal to the number of second holes aligned on the flange (8). For illustrative purposes FIGS. 3 and 4 show only three second holes of the flange. In such a case, the user may decide to insert the lock pin (31) in one of the three second holes (8b', 8b'', 8b''') of the second flange (8) of the head tube (1) of the motor unit (10), as well as in the two second holes (23b) of the two brackets (23) of the frame (20).

If the user chooses the first one (8b') of the three second holes—i.e. the closest hole to the head tube (1)—, the steering column (1a) will have a substantially vertical position.

In such a case, the swiveling wheels (RA) of the wheelchair (C) are brought to a maximum height from the ground and the wheelbase of the "self-moving vehicle" (MS) is reduced. The term "wheelbase" refers to the distance between the axis of the steering wheel (4) of the device (D) and the axis of the two lateral wheels (RL) of the wheelchair (C).

The consequence is a higher transfer of the total weight of the "self-moving vehicle" (MS) on the steering wheel (4) of the device (D), thus giving a better directionality and mobility to the steering wheel.

If the user chooses the second (8b'') or the third one (8b''') of the second holes of the flange (8), the head tube (1) and consequently also the steering column (1a) and the fork (2) will be more or less tilted with respect to a vertical axis.

The additional consequences are a reduction of the height from the ground of the swiveling wheels (RA) of the wheelchair (C), an increase of the wheelbase of the "self-moving vehicle" (MS) and a reduction of the total weight discharged on the steering wheel (4), with lower directionality and mobility of the steering wheel.

I claim:

1. A motor power device for wheelchairs that are used by disabled users, the wheelchair having a bearing frame that supports a seat of the wheelchair, the motor power device comprising:
   a motor unit having a head tube and an electric motor and a brake;
   a steering column inserted into said head tube, said steering column supporting a handlebar at an upper end thereof and a fork at a lower end thereof, said handlebar having controls mounted thereon, said controls adapted to actuate said electric motor and said brake;
   a wheel received in said fork such that said steering column can pivot said wheel;
   an intermediate frame removably mounted on said motor unit, said intermediate frame adapted to be removably attached on the bearing frame of the wheelchair such that said intermediate frame is positioned between said motor unit and the wheelchair;
   a first inclination adjuster disposed between said motor unit and said intermediate frame, said first inclination adjuster adapted to adjust an inclination of said head tube with respect to said intermediate frame; and
   a second inclination adjuster disposed between said intermediate frame and the bearing frame of the wheelchair, said second inclination adjuster adapted to adjust an inclination of said intermediate frame with respect to the bearing frame of the wheelchair, said intermediate frame having a crosspiece and a pair of arms extending substantially orthogonal to said crosspiece, said first inclination adjuster being mounted to said crosspiece, said second inclination adjuster mounted in end sections of said pair of arms of said intermediate frame.

2. The motor power device of claim 1, wherein said first inclination adjuster comprise a fork protruding upwardly from a center of said crosspiece and a flange radially protruding backward from said head tube so as to be inserted into said fork of said first inclination adjuster, said flange and said fork of said first inclination adjuster comprising first holes adapted to receive a pin so as to hinge said flange to said fork of said first inclination adjuster, said flange having a plurality of second aligned holes, said fork of said first inclination adjuster having a second hole, said first inclination adjuster having a lock pin adapted to be inserted into said second hole and into one of said plurality of second aligned holes so as to block a position of said flange with respect to said fork of said first inclination adjuster.

3. The motor power device of claim 2, said fork of said first inclination adjuster having a parallel pair of plates each having a substantially rectangular shape, said parallel pair of plates disposed orthogonal to an axis of said crosspiece of said intermediate frame.

4. The motor power device of claim 3, wherein said flange is coupled to said fork of said first inclination adjuster with clearance, said first inclination adjuster having a friction means for closing the clearance.

5. The motor power device of claim 4, said friction means comprising:
   a threaded bush disposed on said fork of said first inclination adjuster; and
   a threaded stem having an actuation handle, said threaded stem adapted to be helically coupled into said threaded bush so as to move until said threaded stem is frictionally stopped against said flange.

6. The motor power device of claim 1, said second inclination adjuster comprising:
 a cylindrical sleeve adapted to tighten an upright of the bearing frame of the wheelchair;
 a tubular element having a cylindrical duct adapted to house said end sections of said pair of arms of said intermediate frame,
 a first disk mounted on said tubular element; and
 a second disk mounted on said cylindrical sleeve, wherein said first disk and second disk are revolvingly coupled so as to adjust the inclination of the intermediate frame with respect to the bearing frame of the wheelchair.

7. The motor power device of claim 6, wherein said second disk has a through hole and said first disk has a threaded hole, wherein said second inclination adjuster has a tightening bolt that passes through said through hole of said first disk and is threadedly received into said threaded hole of said second disk.

8. The motor power device of claim 6, wherein each of said first disk and said second disk has a coupling face having a plurality of radial ribs and a plurality of grooves.

9. The motor power device of claim 5, wherein said cylindrical sleeve has a pair of semi-cylindrical jaws that are tightened with connection screws.

10. The motor power device of claim 5, wherein said tubular element comprises a threaded hole extending radially with respect to the cylindrical duct, wherein said second inclination adjuster has a screw provided with a knob, said screw screwed into said threaded hole so as to abut against said end section of the said pair of arms of said intermediate frame.

11. The motor power device of claim 1, wherein each of said pair of arms of said intermediate frame has a first section disposed generally orthogonal with respect to a remaining section of the arm, said first section adapted to be slidingly inserted within an end of said crosspiece of said intermediate frame.

12. The motor power device of claim 1, wherein said head tube has a support plate at a front thereof, said support plate adapted to fix a power supply unit for the electrical motor of said controls.

* * * * *